Patented Dec. 7, 1943

2,335,862

UNITED STATES PATENT OFFICE 2,335,862

INSECTICIDE SPRAY COMPOSITION AND
METHOD OF MAKING THE SAME

Walter C. Klingel, Union, N. J.

No Drawing. Application March 25, 1942,
Serial No. 436,190

18 Claims. (Cl. 167—24)

The present invention relates to an insecticide composition in liquid form adapted for spraying and more particularly to a solution of rotenone or rotenone extract from plants of the Derris species which is particularly adapted for combating certain plant diseases and for the extermination of flies and other insects.

A great deal of difficulty has been experienced in the use of rotenone and rotenone containing materials in solution or liquid form for the spraying of vegetation for the reason that the solvents or organic liquids heretofore known as having a high solvent power for rotenone or rotenoids cannot be applied to plants or trees without causing injury thereto. Such solvents include ethyl acetate, ethyl formate, carbon disulphide, chloroform, benzene and others. The solubility of rotenone and rotenoids is low in methyl alcohol, ethyl alcohol and the heavier petroleum hydrocarbons, such as kerosene and light lubricating oils, which do not ordinarily cause injury to foliage or vegetation.

Attempts have been made to increase the amount of rotenone or Derris extractives in kerosene and other petroleum hydrocarbons by the use of a mutual or supplementary solvent such as acetone and other ketones, safrol and other ethers, alkyl phenols, fatty oils and various other substances, but the increase in solubility has been relatively slight with solvent mixtures which are innocuous to vegetation on which it is to be used. The solubility of rotenone in kerosene at ordinary temperatures is about 0.05 per cent. As far as is known, no mutual or supplemental solvent producing an innocuous admixture with kerosene or petroleum spray oils has been found by means of which the solubility of rotenone has been increased beyond 0.3 per cent.

One of the objects of the present invention is to provide a form of solution of rotenone or rotenoids adapted for the spraying of vegetation in which rotenone is highly soluble and in which the toxicity is greatly increased because of the higher concentration in which it is present.

Another object of the invention is to provide a liquid rotenone-containing insecticide adapted for spraying without substantial loss due to evaporation or volatilization of constituents of the solution and in which the rotenone is present in a relatively high concentration so as to be highly toxic to insects when applied as a spray.

Another object of the invention is to provide a form of insecticide adapted for the spraying of foliage in which a solvent is used in which rotenone is highly soluble and which of itself is toxic to insects and combines its toxicity with that of rotenone when the latter is dissolved therein.

Another object of the invention is to provide a form of insecticide containing rotenone in a liquid solvent in which the rotenone is highly soluble and present in a high concentration, and in which the solvent has a relatively low penetration into the fascular system of plants.

Another object of the invention is to provide a solvent for rotenone and rotenoids in which these materials are highly soluble and which is mutually soluble with kerosene and other petroleum hydrocarbons suitable for spray oils so as to form a homogeneous solution in which rotenone and rotenoids are highly soluble.

Another object of the invention is to provide a solvent in which rotenone is highly soluble and which may be used as a supplementary solvent with pretroleum hydrocarbons providing a high solubility and concentration of rotenone in the admixture without deleterious effect upon vegetation when used as a spray.

With these and other objects in view, the invention comprises the various features hereinafter more fully described and defined in the annexed claims.

It is well known that rotenone may be obtained from Derris root, cube root, Lonchocarpus, Tephrosia and other related plants by extraction therefrom with a suitable solvent, such as ether, methyl alcohol, ethyl alcohol, petrolic ether, chloroform, carbon tetrachloride and other solvents above referred to. As the resulting solutions are unsatisfactory for use in spraying of vegetation, it is preferable to evaporate the solvent therefrom to recover the rotenone which has been extracted.

In carrying out the present invention, I may employ pure rotenone, or an extract obtained from one of the rotenone-containing materials above referred to, which I dissolve in unsymmetrical di-butyl urea, or N,N-Di-n butyl urea. This liquid solvent is substantially odorless and has a boiling point of about 119° C. (246.2° F.). It has a specific gravity of about .94 at 25° C. (77° F.) and a gravity of .917 at 60° C./15° C. and is straw-colored at ordinary temperatures. The unsymmetrical di-butyl urea may be prepared in any suitable manner or may be purchased on the open market. One method for the preparation of this solvent is disclosed on page 4 of the U. S. Patent No. 2,253,528, as set forth in "Example 4." I have discovered that unsymmetrical di-butyl urea has a substantial toxic effect on a large variety of insects and may be used alone, therefore, as an insecticide against flies and other pests. I have also discovered that this material has a high solvent power for rotenone, the solubility of rotenone therein being many times that in any other known solvent which is innocuous to vegetation, and a solution of rotenone in unsymmetrical di-butyl urea has an extremely high toxicity toward insects when sprayed upon vegetation in the ordinary manner. This is due in all probability to the high concentration of rotenone in the solvent, to the toxic action of the solvent itself and to the relatively high boiling point of the material by which only relatively small amounts are lost by evaporation. A solution of rotenone or a rotenoid in unsymmetrical di-butyl urea in concentrations of from 5 to 100 parts of the solute to 100 parts of the solvent is particularly effective as an insecticide for the spraying of tomatoes, peas, beans, cabbage and various other vegetation.

In preparing a solution of rotenone in unsymmetrical di-butyl urea, I preferably employ from one to ten parts by weight of rotenone to ten parts by weight of unsymmetrical di-butyl urea, the solvent being heated in a container to a temperature of from 180° F. to 220° F., the material being stirred for a suitable length of time depending upon the amounts of materials used. If relatively small amounts are employed, as for example, one to four grams of pure rotenone with ten grams of unsymmetrical di-butyl urea, heated to 220° F. (104° C.) and the material is continuously stirred, the solution of the rotenone will take place in about three minutes. With larger proportions of rotenone, solution takes place in a relatively longer period of time, and similarly if lower temperatures are employed while the rotenone is being dissolved, solution occurs also in relatively longer time intervals. When the solutions containing up to 100 percent saturation of rotenone are cooled to ordinary temperatures the rotenone remains in solution. If the solutions are prepared with the use of an excessive amount of rotenone, or amounts greater than a 1 to 1 ratio of rotenone to unsymmetrical di-butyl urea, the excess rotenone precipitates to the bottom of a container upon cooling to ordinary temperatures. The clear saturated solution may then be decanted from the undissolved rotenone, or the solution may be filtered, if desired, in order to separate the solution from the undissolved rotenone. A substantially saturated solution of rotenone at ordinary temperatures is a viscous liquid having a deep red color. The procedure in forming a similar solution with rotenone Derris extracts is similar to that above described and the results are substantially the same. Rotenone may be extracted from a rotenone-containing material by treatment with unsymmetrical di-butyl urea heated to a temperature of from 180° to 220° F., for example, until the solvent is substantially saturated, after which the solution may be cooled to substantially room temperature and the undissolved material may be separated from the remainder of the solution.

The concentrations of rotenone obtainable with the use of unsymmetrical di-butyl urea are substantially higher than are required for the spraying of vegetation and a solution as above prepared mixes very readily with a neutral spray oil, such as a petroleum hydrocarbon spray oil having the desired spray characteristics and which is mutually soluble with unsymmetrical di-butyl urea. For this purpose I may employ kerosene or a relatively light lubricating oil.

In preparing a rotenone insecticidal spray composition containing kerosene, for example, I preferably first prepare an unsaturated solution of rotenone in unsymmetrical di-butyl urea containing three parts by weight of rotenone to ten parts by weight of unsymmetrical di-butyl urea by dissolving the rotenone therein at an elevated temperature as above described. About one hundred parts by weight of kerosene is then heated preferably to a temperature of about 200° F., at which temperature the rotenone solution will combine rapidly with the kerosene. The heated kerosene is preferably added to the rotenone solution while the latter is suitably stirred, whereby the resulting solution remains clear. The final solution after it has been stirred sufficiently to form a homogeneous solution is permitted to cool to ordinary temperature, which may stand indefinitely without precipitation of any of the rotenone in the solution or the formation of any layers in the clear solution.

If amounts of rotenone substantially in excess of the proportions above stated are employed, as for example, if four parts of rotenone to ten parts of unsymmetrical di-butyl urea to one hundred parts of kerosene are used, a clear solution is obtained at the temperature of 200° F., but when the resulting solution is cooled to ordinary temperatures precipitation takes place in the solution and a dense emulsion is formed. Proportions of rotenone in excess of four parts by weight with the same parts by weight of the combined solvent as above stated produce the same formation of emulsion, which appears to be a colloidal suspension of the rotenone which has formed in the solution. As the suspension remains the same for a long period of time, the emulsion in this form may be used for spraying upon vegetation, although the concentrations of rotenone in clear solutions prepared as above stated have ample toxicity for all practical purposes. Solutions of rotenone containing from one to three parts by weight of rotenone to ten parts by weight of unsymmetrical di-butyl urea and one hundred parts of kerosene or a light lubricating oil are satisfactory as a spray insecticide for most purposes and may be readily prepared in the manner above disclosed even without heating the solutions when the surrounding temperature is above 72° F., or normal temperature. (Such solutions correspond to about 0.9% to 2.6% of rotenone by weight.)

If the same solvent mixture is used with Derris resinate containing 25 percent of rotenone instead of pure rotenone, amounts of the Derris resinate up to two and one half parts by weight may be dissolved in ten parts by weight of unsymmetrical di-butyl urea and combined with one hundred parts by weight of kerosene or a petroleum hydrocarbon spray oil without the formation of a precipitate or an emulsion in the resulting solution. Amounts of the Derris resinate substantially above this proportion, however, cause the formation of an emulsion when the solution is cooled to ordinary temperatures or even at the elevated temperature of about 200° F. when amounts in excess of five parts by weight of the Derris resinate with the proportions of the mixed solvent are used. It is to be understood however that for some purposes the emulsion which contains high concentrations of rotenone dissolved in the mixed solvent containing unsymmetrical di-butyl urea may be entirely satisfactory and contains lethal proportions of rotenone against flies, for example, without being injurious to persons or cattle or other vertebrate animals, with the exception of fish and some of the lower forms of animal life.

It will be understood that the solubility of rotenone and rotenone-containing materials in unsymmetrical di-butyl urea and in mixed solvents containing the same depends to a considerable extent upon the purity of the rotenone and the specific impurities present therein and on the purity of the solvent or solvent mixture and the character of the impurities therein. It will be apparent that the solubility of the rotenone or rotenoid material in unsymmetrical di-butyl urea and mixtures thereof with petroleum hydrocarbons or other solvent material may vary to a considerable extent, but with a trial run, or a simple test, the point at which precipitation occurs or an emulsion is formed may be readily determined in a given case in which unsymmetrical di-butyl urea is used as the main solvent or in which it is employed as a mutual or supplementary solvent with a larger proportion of a spraying material or distributing medium for applying the toxic material to vegetation or the locus in which it is to be used.

While the invention as described constitutes the preferred form and mode of carrying out the invention, it is apparent that various changes or modifications thereof may be made without departing from the spirit of the invention as above described or as defined in the claims annexed hereto.

Having thus described the invention, what is claimed as new is:

1. A liquid insecticide spray composition comprising rotenone dissolved in unsymmetrical dibutyl urea in concentration greater than one percent in the solution.

2. A liquid insecticide spray composition comprising a substantially saturated solution of rotenone in unsymmetrical di-butyl urea.

3. A liquid insecticide spray composition comprising rotenone dissolved in an admixture of solvents including mainly unsymmetrical dibutyl urea and a petroleum hydrocarbon adapted for spraying.

4. A liquid insecticide spray composition comprising a substantially saturated solution of rotenone in an admixture of solvents containing mainly kerosene with unsymmetrical di-butyl urea as a mutual solvent.

5. A liquid insecticide spray composition comprising about three parts by weight of rotenone dissolved in about ten parts by weight of unsymmetrical di-butyl urea.

6. A liquid insecticide spray composition comprising about three parts by weight of rotenone in a solution comprising ten parts by weight of unsymmetrical di-butyl urea and one hundred parts by weight of a petroleum hydrocarbon adapted for spraying.

7. A liquid insecticide spray composition comprising a substantially saturated solution of rotenone in an admixture of kerosene and unsymmetrical di-butyl urea as a supplemental solvent in which the supplemental solvent is present to the extent of about one tenth of the kerosene in parts by weight.

8. A liquid insecticide spray composition comprising a rotenoid dissolved in unsymmetrical dibutyl urea and kerosene to the extent of substantial saturation at ordinary temperatures.

9. A method of forming a liquid insecticide spray composition containing in excess of one percent of rotenone in solution which comprises dissolving said rotenone in unsymmetrical dibutyl urea in an amount in excess of one part of rotenone to one hundred parts by weight of the solvent.

10. A method of forming a liquid insecticide spray composition containing a substantially saturated solution of rotenone which comprises dissolving rotenone in unsymmetrical di-butyl urea heated to a temperature in the neighborhood of about 200° F., to which an excess of rotenone is added, cooling the solution to ordinary temperatures and separating the undissolved rotenone from the solution.

11. A method for the preparation of a liquid insecticide spray composition containing in excess of one percent of rotenone which comprises dissolving the required amount of rotenone in a solvent containing unsymmetrical di-butyl urea heated without substantial vaporization to a temperature substantially above normal, stirring the admixture until the said rotenone is dissolved and cooling the solution to normal temperature.

12. A method for the preparation of a liquid insecticide spray composition containing rotenone which comprises extracting rotenone from rotenone-containing material by means of unsymmetrical di-butyl urea heated to a temperature of from 180° to 220° F. until the solvent is substantially saturated, cooling the solution to substantially room temperature and separating the undissolved material from the remainder of the solution.

13. A method for the preparation of a liquid insecticide spray composition containing rotenone which comprises dissolving rotenone in unsymmetrical di-butyl urea as a mutual solvent in which the rotenone is present in a concentration required for forming a substantially saturated solution in the final solvent mixture, incorporating the resulting solution into a proportion of a petroleum hydrocarbon spray oil to form a substantially saturated solution of the rotenone in the solvent mixture and stirring the resulting admixture to form a substantially homogeneous solution.

14. A method for the preparation of a liquid insecticide spray composition containing rotenone which comprises forming a solution of rotenone in unsymmetrical di-butyl urea in which the solution is about one-third saturated and incorporating the said solution into a comparatively large amount of kerosene to form a substantially saturated solution of rotenone in the mixed solvent in which the said unsymmetrical di-butyl urea serves as a mutual solvent.

15. A method for the preparation of a liquid insecticide spray composition containing rotenone which comprises dissolving about three parts by weight of rotenone in about ten parts by weight of unsymmetrical di-butyl urea heated to a temperature above normal without substantial vaporization thereof and cooling the resulting solution to substantially normal temperature.

16. A method for the preparation of a liquid insecticide spray composition containing rotenone which comprises dissolving about three parts by weight of rotenone in about ten parts by weight of unsymmetrical di-butyl urea heated to about 200° F., heating about one hundred parts of a petroleum hydrocarbon adapted for spraying to a temperature of about 200° F., admixing the said petroleum hydrocarbon with the said solution of rotenone in unsymmetrical di-butyl urea at substantially the said temperature, stirring the admixture to obtain a substantially homogeneous solution and cooling the solution to ordinary temperature.

17. A method for the preparation of a liquid insecticide spray composition containing rotenone which comprises dissolving about three parts by weight of rotenone in about ten parts by weight of unsymmetrical di-butyl urea, adding kerosene thereto in amounts to form a substantially saturated solution of rotenone in the solvent admixture and stirring the admixture to obtain a substantially homogeneous solution.

18. A method for the preparation of a liquid insecticide composition containing rotenone which comprises extracting rotenone from rotenone-containing material by means of unsymmetrical di-butyl urea and separating the undissolved material from the remainder of the solution.

WALTER C. KLINGEL.